United States Patent [19]

Koper et al.

[11] Patent Number: 5,311,280
[45] Date of Patent: May 10, 1994

[54] LASER LIGHT LENGTH CONTROL ASSEMBLY FOR RING LASER GYRO

[75] Inventors: James G. Koper; Bo H. G. Ljung, both of Wayne; Walter J. Krupick, Succasunna, all of N.J.

[73] Assignee: Kearfott Guidance & Navigation Corporation, Wayne, N.Y.

[21] Appl. No.: 515,756

[22] Filed: Jul. 21, 1983

[51] Int. Cl.$^5$ .................. H01L 41/10; G01B 9/02; G01C 19/64
[52] U.S. Cl. ..................... 356/350; 372/94; 372/107; 359/198; 359/212
[58] Field of Search ............ 372/94, 99, 107; 356/350; 350/484, 486, 487, 298; 310/332, 369

[56] References Cited

U.S. PATENT DOCUMENTS

| | | | |
|---|---|---|---|
| 3,581,227 | 5/1971 | Podgorski . | |
| 4,035,081 | 7/1977 | Sepp et al. | 356/350 |
| 4,113,387 | 9/1978 | Shutt | 372/94 |
| 4,160,184 | 7/1979 | Lyung | 356/350 |
| 4,203,654 | 5/1980 | Ellis | 350/487 |
| 4,269,486 | 5/1981 | Shintani | 350/486 |
| 4,348,113 | 9/1982 | Banfils | 356/350 |
| 4,383,763 | 5/1983 | Hutchings et al. | 356/350 |
| 4,488,789 | 12/1984 | Kenney | 350/483 |

FOREIGN PATENT DOCUMENTS 0651296  3/1979  U.S.S.R. .............. 350/487

*Primary Examiner*—Nelson Moskowitz

[57] ABSTRACT

A piezoelectric actuator for use in controlling the path length, for example, in a ring laser gyro is made of two piezoelectric discs attached to a metallic structure for exerting a push-pull force thereon to move the metallic structure in an oil can fashion. The piezoelectric actuator is attached to a dual diaphragm mirror assembly in such a way as to impart a strictly linear motion to the mirror assembly without any deleterious rotational effects. The actuator can easily be optimized for varying diaphragm stiffness by adjusting the thickness of the metallic structure to which the piezoelectric discs are attached. The mirror assembly and actuator are designed to minimize the influence of temperature changes on the position of the path length mirror.

2 Claims, 1 Drawing Sheet

5,311,280

LASER LIGHT LENGTH CONTROL ASSEMBLY FOR RING LASER GYRO

BACKGROUND OF THE INVENTION

This invention relates to a ring laser gyros, and more particularly to an actuator for controlling laser light path length in a ring laser gyro by changing the position of a mirror.

Prior art path length actuators for ring laser gyros are described in U.S. Pat. No. 4,160,184 ("Piezoelectric Actuator") issued to Bo Ljung. Such actuators generally comprise a plurality of piezoelectric discs assembled into a stack. A stack can implement the required stroke if it is made sufficiently large.

The main disadvantage with prior art designs is their complexity; the designs involve many piezoelectric elements and many adhesively bonded interfaces. This complexity affects the cost of the actuator and the reliability. Moreover, it is difficult if not impossible to optimize the piezoelectric stack to a particular spring constant of the mirror assembly. This causes the designer to choose a massive stack which can provide sufficient force to move the path length mirror the required distance.

Further disadvantages arise in bonding a stack of piezoelectric discs with adhesive. Maintaining electrical contact to an outside source requires the use of conductive adhesives, which unfortunately are poor in quality an can lose their conductive properties over time. In addition, because the thermal coefficient of expansion for piezoelectric materials changes as a function of age, a match to other low expansion materials used in the ring laser gyro construction is difficult or impossible.

A stack of piezoelectric wafers is usually rigid not only axially but also rotationally. If the stack is imperfectly bonded, it will rotate by tilting when energized. It is common that such stack tilt will couple into the mirror. Such a rotation, if it is larger than 0.01 seconds of arc, is deliterious for the ring laser gyro. Such tilts cause a displacement of the laser beams inside the gyro, which under certain conditions can cause a bias shift.

An object of the present invention is to provide a structurally simple, inexpensive and reliable path length actuator wherein the transmission of torques from the actuator to the mirror is minimized if not eliminated. Another object of the present invention is to provide such an actuator in which the circuit energizing the piezoelectric elements has a maximum conducting life and in which the structural mountings of the piezoelectric elements maintain a high level of strength. Yet further objects of the present invention are to provide such an actuator in which the matching of the spring constant of the piezoelectric assembly to the spring constant of the mirror assembly is facilitated and in which differential thermal expansion is compensated.

SUMMARY OF THE INVENTION

An assembly for controlling laser light path length in a ring laser gyroscope comprises, according to the present invention, a diaphragm body with a solid core and an outer wall connected at opposite ends of the body by a pair of thin diaphragm sections. A mirror reflecting surface is provided on one end of the diaphragm body, this mirror surface being laterally coextensive with the diaphragm core. Upon the transmission of a translational force from an actuator mechanism to the diaphragm body, the core shifts while the outer wall remains stationary (with respect to the gyroscope), the thin diaphragm sections bending to accommodate the shift. The actuator device engages the diaphragm body in a small area centered with respect to the core. The contact is such as to minimize the transmission of tilting and twisting forces. Preferably, the diaphragm body consists of a pair of substantially identical halves joined at a low stress, wide area interface midway between the ends of the diaphragm body.

The actuator mechanism comprises a preferably metallic disc sandwiched between two piezoelectric discs and connected to the diaphragm body via a cylindrical flange. The thickness of the metallic carrier disc is variable to match the rigidity of the piezoelectric actuator to the rigidity of the diaphragm body in a direction perpendicular to the mirror surface. Moreover, the carrier flange is axially rigid and radially resilient, thereby compensating for differential thermal expansion between the piezoelectric and metallic discs, on the one hand, and the diaphragm body, on the other hand.

A path length control assembly according to the present invention contains few parts and is, therefore, inexpensive. The piezoelectric discs are mounted with a dielectric structural adhesive, while the operative electrical connections are implemented with solder. Bonding errors between piezoelectric discs in a stack, which often cause tilt and reduced rigidity, are minimized or eliminated.

DETAILED DESCRIPTION

Figure 1:
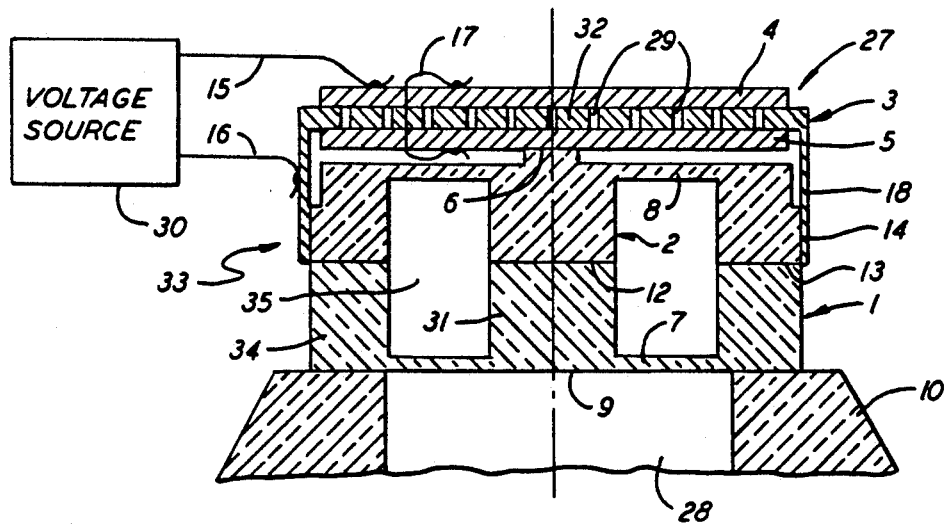
FIG. 1 is a cross-sectional side view of the path length control mirror installed on a ring laser gyro showing a diaphragm assembly and a piezoelectric actuator according to the present invention.

As illustrated in FIG. 1, a path length control assembly according to the present invention comprises three parts: a glass ceramic lower diaphragm member 1, a glass ceramic upper diaphragm member 2, and a piezoelectric actuator 27. The purpose of the path length control assembly is to tune a laser light cavity 28 of a ring laser gyroscope 10 by a linear deflection of a mirror surface 9. The magnitude of motion in FIG. 1 exaggerated for illustration. Actual deflections are approximately 100 microinches. The deflection must be free of tilt as this degrades gyro performance. The present invention implements this goal.

Diaphragm member 1 has a thin annular diaphragm section 7 which lies in a transverse plane parallel to mirror surface 9 and which allows the mirror surface 9 to deflect. In order to eliminate tilt, upper diaphragm member 2 is attached to diaphragm member 1. Diaphragm member 2 is similar in shape and material to diaphragm member 1 and has an annular section 8 parallel to diaphragm section 7.

By rigidly bonding the diaphragm members 1 and 2 together at areas or joints 12 and 13, a diaphragm assembly 33 having a core 31 which will freely deflect in an axial direction, while being highly resistant to tilting motions, is formed. Joints 12 and 13 are located at a distance from the diaphragm sections 7 and 8 to eliminate any effects of bending stress on the joints. An important advantage of the two piece structure is low cost of fabrication since the diaphragm members can be machined from both sides.

Diaphragm assembly 33 includes the cylindrical solid portion or core 31 and an outer wall 34 coaxial therewith and substantially surrounding the core. Core 31 and wall 34 are connected to one another by diaphragm sections 7 and 8 at opposite ends of diaphragm assembly 33. An annular chamber 35 formed in assembly 33 is defined by core 31, wall 34 and sections 7 and 8. Core 31 is substantially coextensive with the operating or effective part of mirror surface 9, i.e., core 31 has a cross-sectional area approximately equal to the area of the laser light mirror and extends axially from surface 9 in a direction away from cavity 28.

Figure 2:
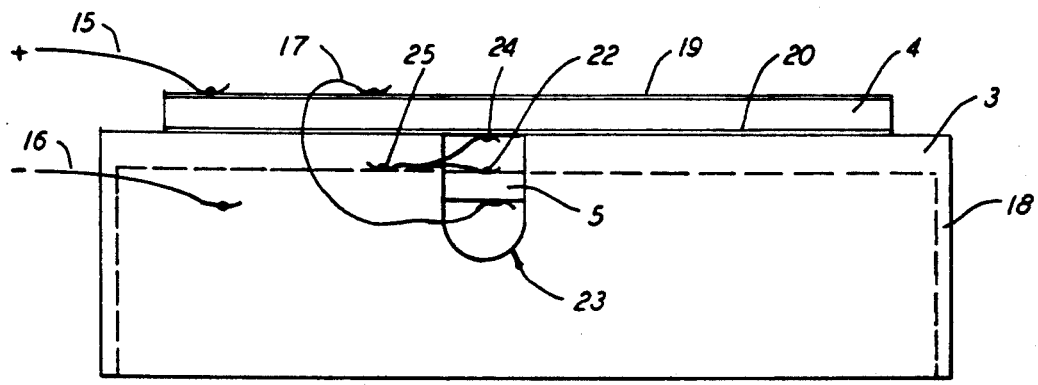
FIG. 2 is a detailed side view of the components comprising the piezoelectric actuator of FIG. 1.

Diaphragm Core 31 is shifted by means of piezoelectric actuator 27. This actuator includes two piezoelectric discs 4 and 5 attached to opposite sides of a carrier member 32 of a metallic support structure 3 by adhesive bonding. As shown in FIG. 2, the outer electrode surfaces or faces 19 and 20 of discs 4 and 5 are electrically connected by soldering the ends of a jumper wire 17 to each face. The inner electrode surfaces or faces are likewise connected by soldering wires from points 22 and 24 to point 25 on the metallic structure. The metallic structure has at least one cutout section or aperture 23 to provide space for the solder joints. Electrical leads 15 and 16 extend from oppositely polarized terminals Of a voltage source 30 to the outer electrode of disc 4 and to metallic structure 3, respectively. The piezoelectric discs are polarized such that a positive potential on lead 15 with respect to lead 16 causes disc 4 to decrease in diameter and disc 5 to increase in diameter. The net effect is bowing or bending of actuator 27. The actuator is assembled to the mirror structure by adhesive bonding at areas or joints 6 and 14 (see FIG. 1). A small axial preload force is applied to metallic structure 3 during bonding to assure firm contact at area 6 under all operating conditions.

Figure 3:
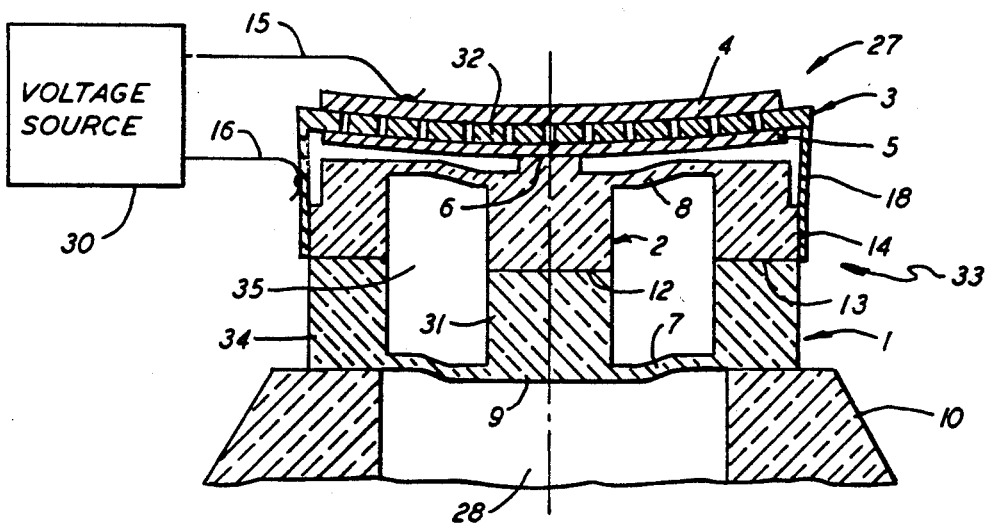
FIG. 3 is a cross-sectional side view of the path length control mirror of FIG. 1 in its actuated position.

The bending of actuator 27 upon the energization thereof transmits a force through area 6 and core 31, causing mirror surface 9 to be shifted linearly inwardly, as illustrated in FIG. 3. Reversing the polarity of the voltage applied via leads 15 and 16 causes the mirror to be pulled outward. Voltage source 30 may have an internal switch for reversing the polarity.

Several important features of this pathlength control assembly should be noted. All forces are transmitted through area 6 on the dual diaphragm assembly 33. Area 6 is machined on the center of diaphragm member 2 and is of minimal size, which results in a joint of low torsional stiffness between the piezoelectric actuator 27 and diaphragm members 1 and 2. Thus the actuator is not able to transmit spurious torques that might tilt mirror surface 9.

Metallic support structure 3 is cup shaped and has a thin cylindrical projection or flange 18 which separates piezoelectric discs 4 and 5 from the mirror structure. This projection is axially rigid but radially flexible or yielding. The radial resilience compensates any difference in radial thermal expansion between piezoelectric actuator 27 and diaphragm members 1 and 2. Without this feature actuator 27 would bend as a function of temperature, thereby causing unwanted deflection of mirror 9.

Piezoelectric discs 4 and 5 are spaced apart by the thickness of carrier member or disc 32. The greater the thickness of the disc the greater the axial stiffness or rigidity of actuator 27. Designing this stiffness in relation to the stiffness of the mirror structure results in maximum piezoelectric deflection. An optimum coupling is achieved when the spring rate or spring constant of actuator 27 is equal to the spring constant of dual glass ceramic diaphragm members 1 and 2.

Because mechanical provision is made for soldering wires from the inner electrodes of piezoelectric discs 4 and 5 to metallic structure 3, it is not necessary to use conductive adhesive to bond the discs. Thus a stronger, more reliable structural adhesive can be used. The solder, moreover, is less prone than conductive adhesive to suffer a diminution in conductivity over time.

It is to be noted that the present invention is not limited to use on ring laser gyros but may be used on linear lasers or other optical devices requiring tilt free deflection of a mirror. The diaphragm can be made of materials other than glass ceramic. In some applications diaphragms of dissimilar materials may be acceptable.

Variations on the design of the low torsional stiffness coupling 6 between actuator 27 and diaphragm members 1 and 2 are possible. These variations include the use of flexible metal joints.

If desired, a controlled deflection of mirror surface 9 as a function of temperature may be induced for example, by cementing a thin metallic disc to the outside of piezoelectric disc 4 or 5. The difference in thermal expansion of this part will cause actuator 27 to bend as a function of temperature. The direction of the bending will depend on which piezoelectric disc carries the metallic disc.

As mentioned above, the efficiency of piezoelectric actuator 27 is related to the spacing between discs 4 and 5. Normally the spacer is a solid metal section (i.e. disc 32) of structure 3. An alternative method is to relieve the metal section with, for instance, a multitude of holes or perforations 29 (See FIG. 1). Such perforations will increase the efficiency of the actuator since less energy will be wasted in bending the metal part. Because piezoelectric discs 4 and 5 remain spaced apart, they will still have optimum stiffness in relation to the mirror structure.

What is claimed is:

1. A device for translationally shifting a mirror surface of a mirror of a ring laser gyro for controlling its path length, comprising:

a diaphragm assembly carrying the mirror surface and having a centrally disposed solid portion, an outer wall substantially surrounding said solid portion and coaxial therewith, and a chamber between said solid portion and said outer wall, said solid portion extending axially from said mirror surface and having a transverse surface coextensive therewith, said diaphragm assembly also including, on opposite sides, a pair of thin diaphragm sections connecting said solid portion to said outer wall and, in an unactuated state of said diaphragm assembly, lying in respective transverse planes parallel to said mirror surface; and actuator means engaging said diaphragm assembly at an end thereof opposite said mirror surface and in an area of contact substantially centered with respect to said solid portion for transmitting a translational force thereto shift said mirror surface, wherein said diaphragm assembly comprises of pair of diaphragm members substantially identical structurally, each of said diaphragm members including one of said diaphragm sections, a solid case and a peripheral wall substantially surrounding said core and coaxial therewith, said diaphragm members being attached to one another at a joint disposed substantially midway between said diaphragm sections to minimize bending stress on said joint, and wherein said joint lies in a plane extending parallel to said mirror surface, and wherein said solid portion is cylindrical and said diaphragm sections are annular, and wherein said actuator means includes a support structure attached to said outer wall, said support structure having a carrier member disposed in a plane parallel to said mirror surface, said actuator means further including a pair of piezoelectric discs attached to said carrier member on opposite sides thereof, and wherein said carrier member is in the form of a disc with perforations therein and has, for deflection in a direction perpendicular to said mirror surface, a spring constant with a magnitude predetermined by said perforations.

2. The device define in claim 1 wherein said support structure is substantially cup shaped, said carrier member forming the base of said support structure and the wall of said support structure forming a cylindrical flange connecting said carrier member to said outer wall, and wherein said support structure is metallic and said flange is axially rigid and radially resilient, whereby it can compensate for differences in thermal expansion between said structure and said body, and wherein the thickness of said carrier member is such as to provide said support structure, for deflection in a direction perpendicular to said mirror surface, with a spring constant at least approximately equal to a corresponding spring constant of said diaphragm assembly.

* * * * *